(12) United States Patent
Lindenman et al.

(10) Patent No.: US 6,199,890 B1
(45) Date of Patent: *Mar. 13, 2001

(54) GOOSENECK HITCH ASSEMBLY

(75) Inventors: Thomas W. Lindenman, South Bend; Richard W. McCoy, Granger, both of IN (US)

(73) Assignee: Reese Products, Inc., Elkhart, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/231,453

(22) Filed: Jan. 14, 1999

Related U.S. Application Data

(63) Continuation-in-part of application No. 08/846,698, filed on Apr. 30, 1997, now Pat. No. 5,971,418.

(51) Int. Cl.[7] .................................. B60D 13/00
(52) U.S. Cl. .................. 280/491.1; 280/511; 280/416.1; 280/504.1; 280/507
(58) Field of Search ................. 280/511, 491.1, 280/416.1, 504.1, 507

(56) References Cited

U.S. PATENT DOCUMENTS

| 3,831,982 | * | 8/1974 | Berhardt et al. ................ 280/511 |
| 3,893,713 | * | 7/1975 | Ivy ................................ 280/511 |
| 4,256,324 | | 3/1981 | Hamilton . |
| 4,540,194 | | 9/1985 | Dane . |
| 4,570,966 | * | 2/1986 | Giboney et al. ............. 280/511 X |
| 5,016,898 | * | 5/1991 | Works et al. ................... 280/511 |
| 5,143,393 | | 9/1992 | Meyer . |
| 5,435,585 | | 7/1995 | Chambers . |
| 5,472,222 | * | 12/1995 | Marcy ........................... 280/511 |
| 5,571,270 | | 11/1996 | Larkin . |
| 5,741,022 | * | 4/1998 | Wass et al. ................ 280/416.1 X |
| 5,755,452 | | 5/1998 | Tambornino . |
| 5,906,387 | * | 5/1999 | Wallace ..................... 280/491.1 |
| 5,971,418 | * | 10/1999 | Lindenman et al. ......... 280/491.1 |

* cited by examiner

Primary Examiner—Michael Mar
Assistant Examiner—Toan C To
(74) Attorney, Agent, or Firm—King and Schickli PLLC

(57) ABSTRACT

A gooseneck hitch assembly for mounting on a vehicle includes a hitch ball, a housing and a mounting assembly for securing the hitch ball and housing to the frame of a vehicle. The hitch ball is pivotally connected to the housing and includes a conveniently located lubrication fitting, a pivotally mounted security door with a torsion spring to hold the door in fully open and closed positions, and a latch thereon for securing the door in a closed position and the hitch ball in a towing position. A pair of safety chain anchors in alignment with the hitch ball is pivotally connected to the housing such that one of the anchors overlies and protects the lubrication fitting in the storage position.

8 Claims, 7 Drawing Sheets

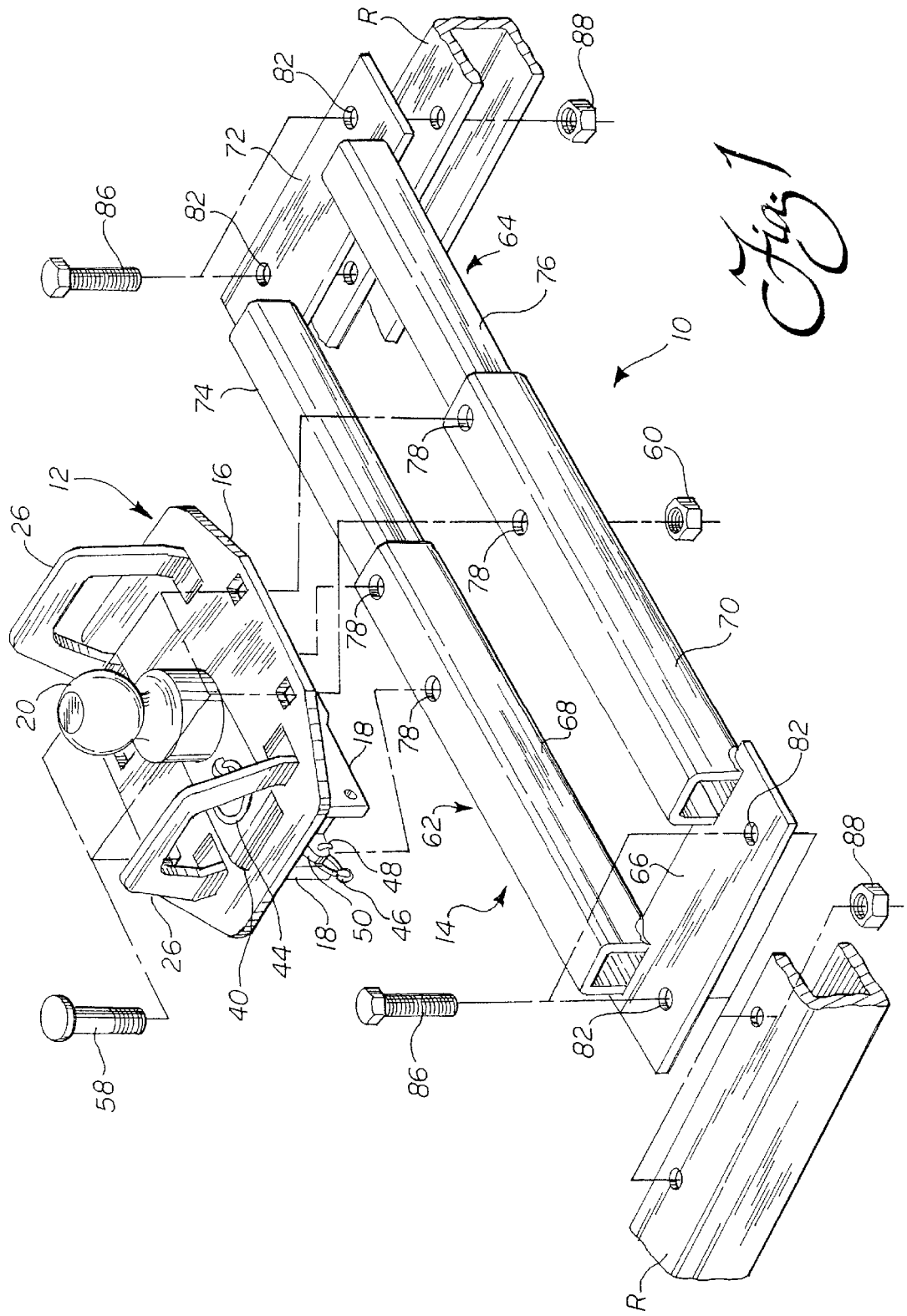

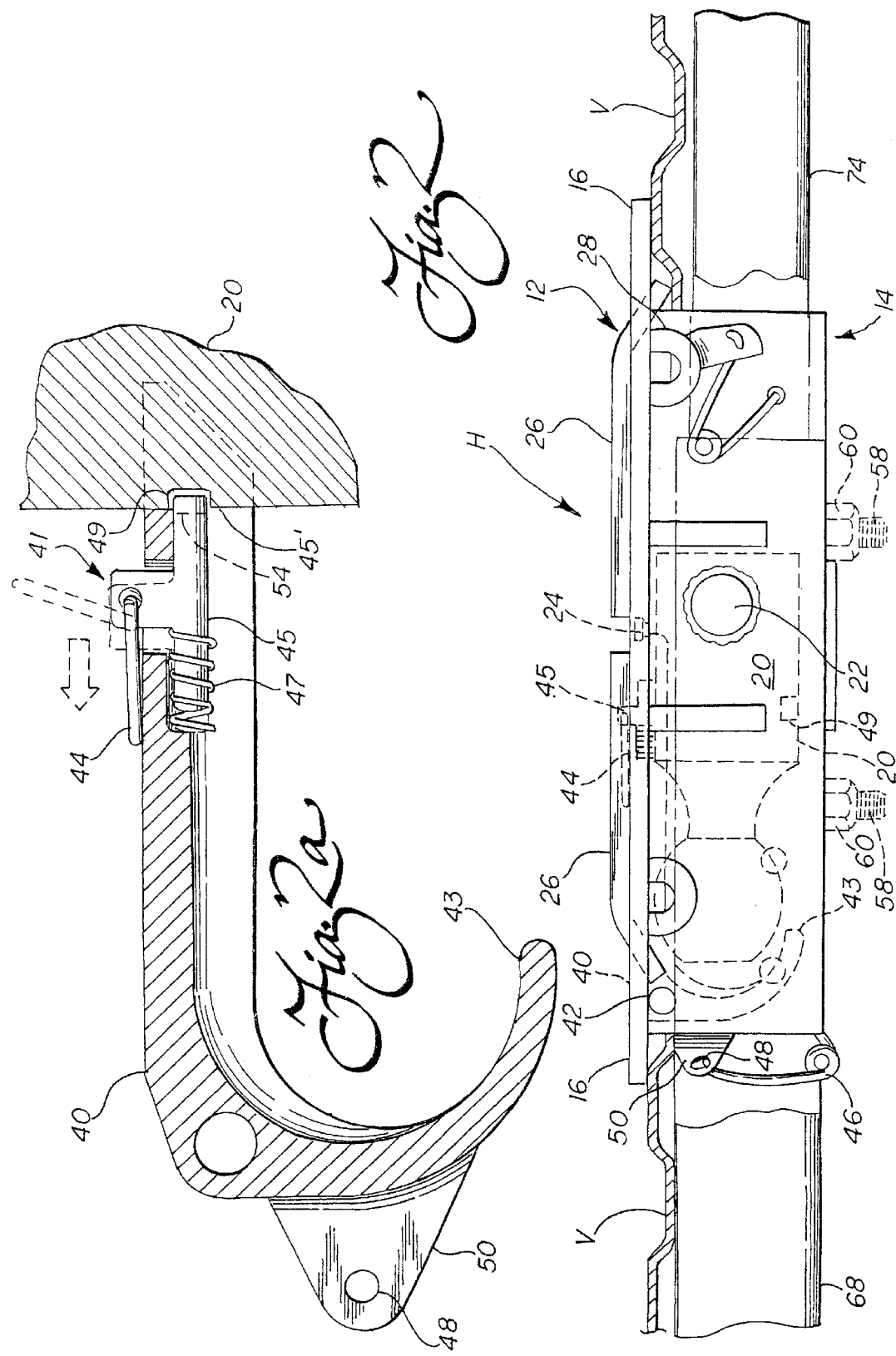

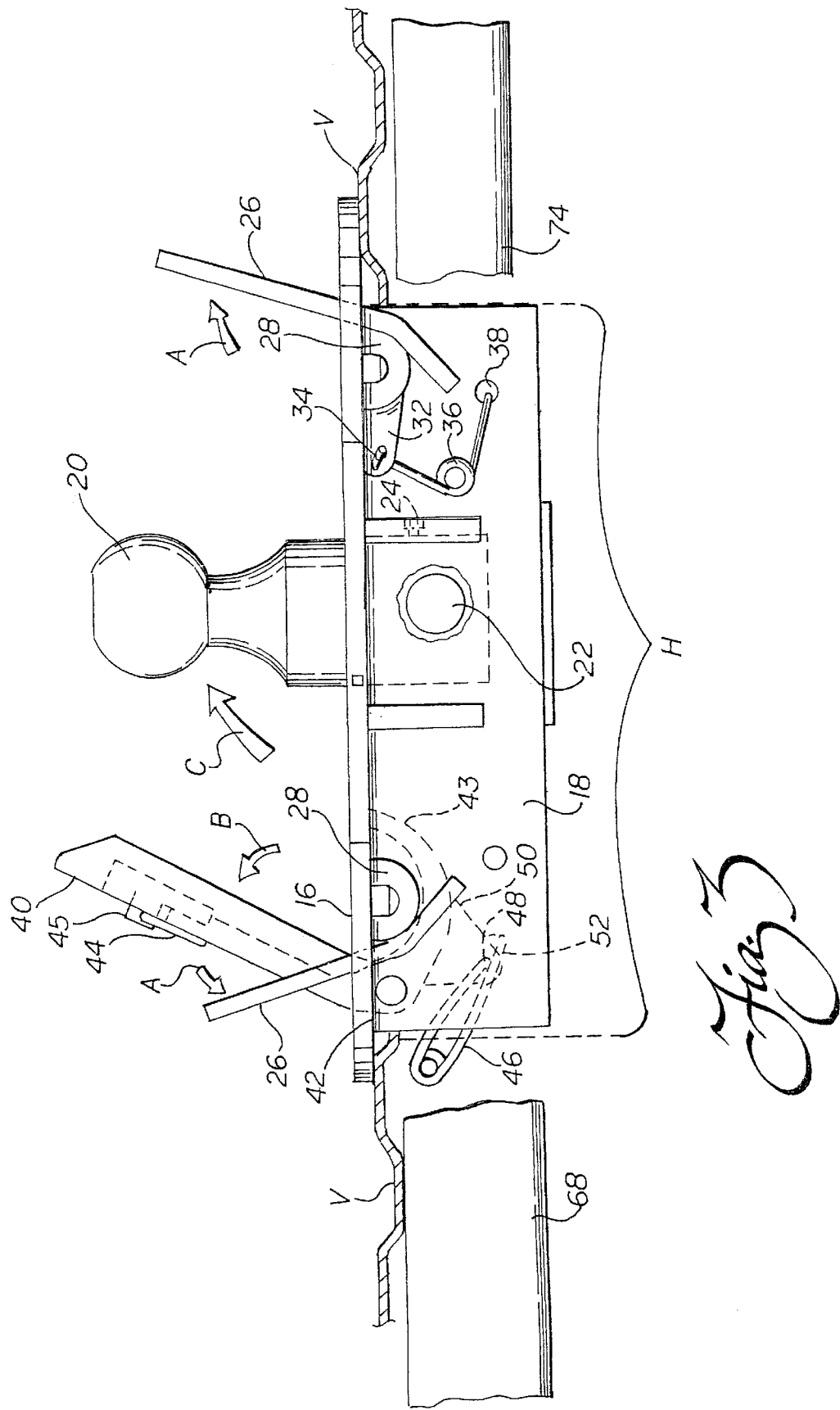

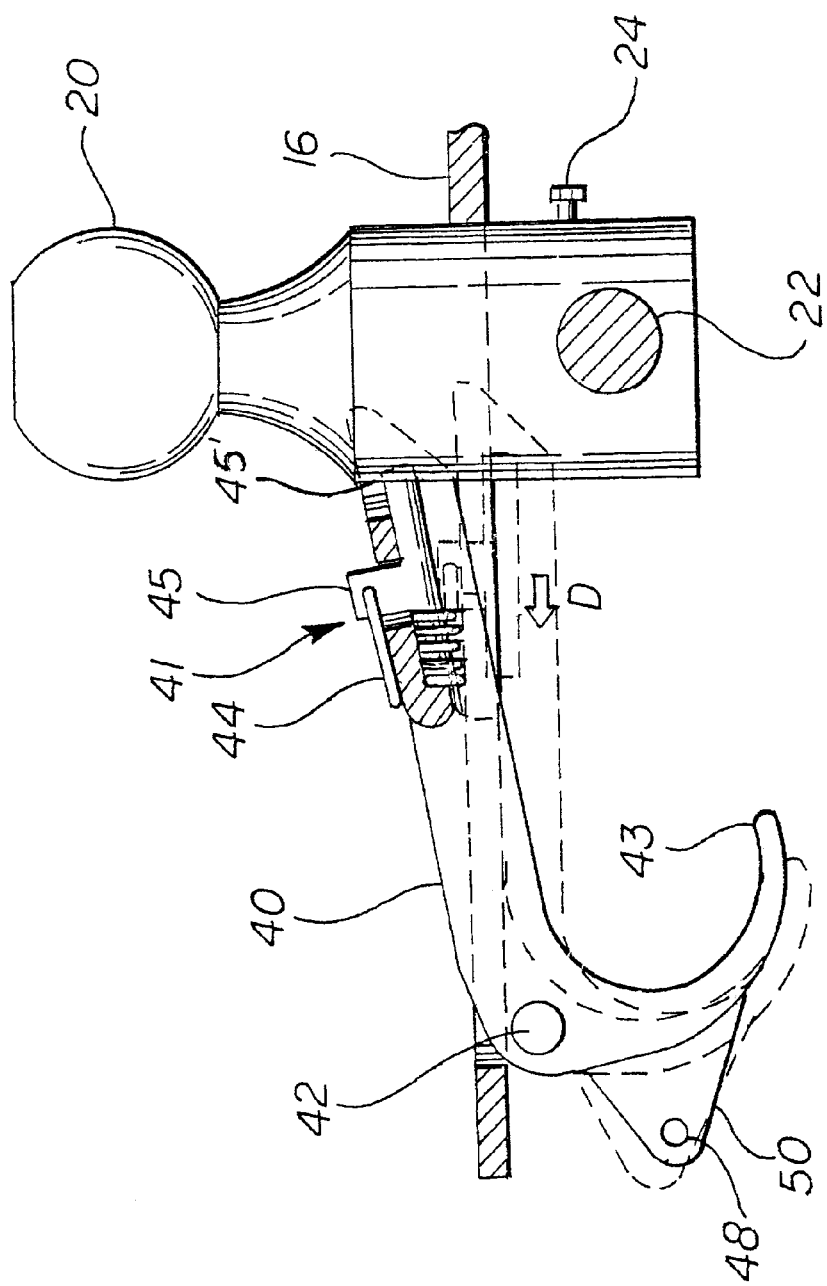

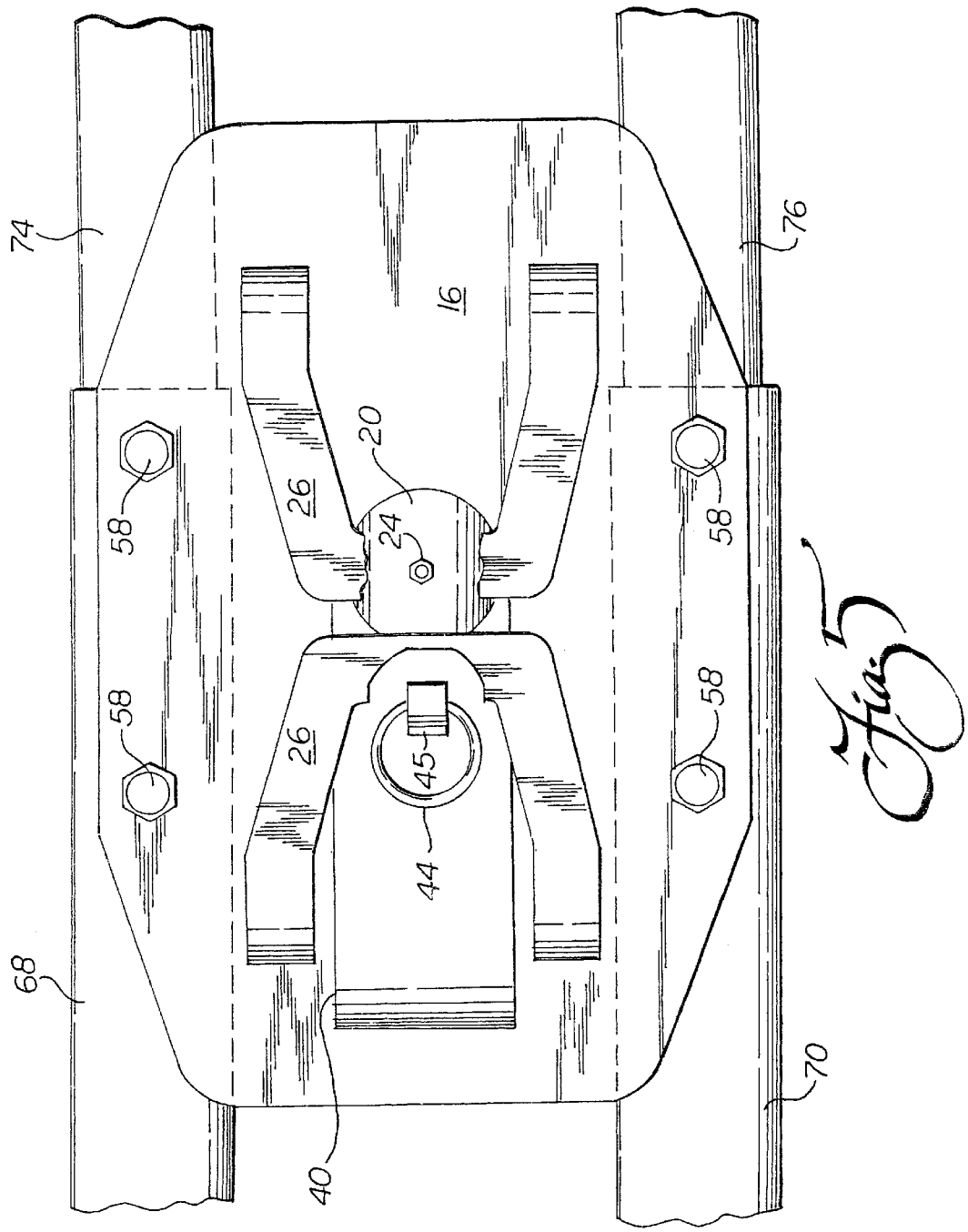

GOOSENECK HITCH ASSEMBLY

This is a continuation-in-part of U.S. patent application Ser. No. 08/846,698 filed Apr. 30, 1997, now issued as U.S. Pat. No. 5,971,418.

TECHNICAL FIELD

The present invention relates generally to the towing field and, more particularly, to a new and simple gooseneck hitch assembly for installation on a vehicle.

BACKGROUND OF THE INVENTION

Ball hitches of the gooseneck type wherein the hitch ball is mounted in the bed of a pick-up truck between the rear wheels of the truck are well known in the art. Examples of such gooseneck hitches are presented in, for example, U.S. Pat. Nos. 4,256,324 to Hamilton; 4,657,274 to Mann et al.; 5,143,393 to Meyer; 5,435,585 to Chambers; and 5,472,222 to Marcy. The primary goal of these designs is to provide as much of the gooseneck hitch assembly as possible beneath the bed of the pick-up truck. Necessarily, the hitch balls themselves are all removable or retractable so that when the hitch is not in use, the hitch ball may be removed or retracted so as not to obstruct the bed of the pick-up truck in any significant manner.

With primary emphasis placed on storing/removing these hitch assemblies so as to avoid obstructions within the truck bed, hitch assemblies have generally overlooked the importance of placement of maintenance fittings and typically only include such fittings in inconvenient locations, such as under the bed of the truck. Of course, a lubrication fitting under the bed of a truck is so inconvenient as to often go unutilized. This neglect often results in damage to the mechanism over time. Accordingly, a need is therefore also identified for a gooseneck hitch assembly that may be easily and conveniently lubricated so as to maintain the moving parts of the hitch ball pivotal connection in peak operating condition at all times.

In addition, little if any attention has been provided to the placement of the numerous differing embodiments of safety anchors associated with such ball hitches or to the additional utilitarian value possibly provided by such anchors. For example, U.S. Pat. Nos. 5,143,393 to Meyer and 5,571,270 to Larkin both disclose safety anchors specifically designed not to obstruct the bed of the pick-up truck in any significant manner. Accordingly each set of safety anchors are placed towards the rear of the hitch assembly. Unfortunately, however, this positioning allows the safety chains to bind under certain operating conditions such as when maneuvering and negotiating tight turns. Therefore, a need is identified for properly placing the safety anchors to avoid binding of the safety chains during difficult and tight maneuvering.

Further, ball hitches of the gooseneck type described above, wherein the ball hitch is pivotally mounted to a frame or housing, are typically difficult to operate with one hand. For example, U.S. Pat. Nos. 4,540,194 to Dane and 5,755,452 to Tambornino each disclose pivotal hitch balls having a locking pin that extends through the shank of the ball hitch and engages the frame or housing for securing the ball hitch in a towing position. Accordingly, an operator must grasp and raise the security door portion of the housing that encloses the ball hitch in the stowed position with one hand and simultaneously pull the release mechanism/finger loop with a second hand in order to stow the ball hitch. Clearly, this two step two handed operation can be cumbersome if not difficult in situations where the locking mechanism sticks or binds or when two operators or both hands are not available. Accordingly, a clear need is identified for a ball hitch assembly including a pivotally mounted ball hitch having a quick release single hand operable release means for releasing the hitch ball for movement from a towing position to a stowed position.

SUMMARY OF THE INVENTION

Accordingly, it is a primary object of the present invention to provide a gooseneck trailer hitch assembly for overcoming the above-described limitations and disadvantages of the prior art.

Another object of the present invention is is to provide an improved gooseneck hitch assembly with safety chain anchors that are aligned with the hitch ball substantially perpendicular to the longitudinal axis of the towing vehicle so as to provide a better overall geometry that prevents the safety chains from binding during maneuvering and particularly during the negotiation of tight turns.

Yet another object of the present invention is to provide a gooseneck hitch assembly including a conveniently located lubrication fitting for lubrication of the pivotal connection of the hitch ball with the supporting housing.

Still another object of the present invention is to provide a gooseneck hitch assembly including safety chain anchors displaceable between a receiving position and a storage position and for overlying and protecting the lubrication fitting in the storage position.

A further object of the present invention is to provide simple yet reliable operation by means of a quick release security door latch operable with one hand that positively holds the hitch ball in a towing position and a torsion spring that positively biases and holds that security door in fully closed and fully open positions.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, a gooseneck hitch assembly is provided for installation on a pick-up truck or other vehicle. The hitch assembly includes a hitch ball assembly of a type generally known in the art including a housing and retractable hitch ball. Additionally, the hitch assembly includes a mounting subassembly comprising a two-section telescoping framework. Each section of the framework includes an end plate mounted to a pair of elongated tube struts. Each tube strut of a pair is coextensive and parallel with the other of the pair. The tube struts of one section are telescopingly received in the tube struts of the other section. Fasteners are also provided to secure the end plates of the mounting subassembly to the frame of the vehicle.

The hitch ball assembly may be further characterized as including a pivotal connection between the hitch ball and housing whereby the hitch ball is selectively displaceable between an upright towing position and an inclined storage position. Further, a lubrication fitting is provided for lubricating this pivotal connection. Advantageously, the lubrication fitting is carried on the hitch ball and is exposed and easily assessable on an upwardly facing portion of the hitch ball when the hitch ball is in the storage position. This allows convenient lubrication of the pivotal connection so as to insure that the gooseneck hitch assembly is maintained in peak operating order.

In accordance with an important aspect of the present invention, the safety chain anchors include means for positively holding those anchors in the safety chain receiving and storage positions. Additionally, it is preferred that the safety chain anchors be carried on the housing substantially in alignment with the hitch ball along a first line substantially perpendicular to a second line corresponding to the longitudinal axis of the vehicle to which the gooseneck hitch assembly is mounted. This orientation prevents the safety chains from binding with the trailer and hitch ball connection when maneuvering around tight corners such as commonly occurs in parking lots or trailer campground facilities.

In accordance with another aspect of the present invention, the hitch ball assembly may include a pair of safety chain anchors that are pivotally connected to the housing. Each of the safety chain anchors is selectively displaceable between a safety chain receiving position and a storage position. When in the storage or folded down position, at least one of the safety chain anchors overlies and protects the lubrication fitting thereby preventing that fitting from being damaged inadvertently through contact from a blunt object such as a rock or other article dropped in the bed of a pick-up truck.

In accordance with still another aspect of the present invention, the gooseneck hitch assembly includes a security door pivotally connected to the housing. The security door is selectively displacable between an open position and a closed position. Further, a securing means provides simple yet reliable operation by means of a quick release security door latch operable with one hand. A torsion spring positively biases and holds the security door in fully closed and fully open positions.

More specifically, the securing means is carried by the security door and may, for example, take the form of a spring loaded latch and finger loop. Accordingly, when the hitch ball is in the towing position, the security door may be closed and the latch is biased to extend outwardly into a slot in the hitch ball so as to hold the security door in the closed position. When it is desired to displace the hitch ball to the storage position, the finger loop is pulled retracting the latch from the slot in the hitch ball and raising the security door so as to manually swing the door by its pivotal connection into the open position. The hitch ball may then be displaced to its storage position and the security door again closed.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawing incorporated in and forming a part of the specification, illustrates several aspects of the present invention and together with the description serves to explain the principles of the invention. In the drawing:

FIG. 1 is a partially exploded, perspective view of the hitch assembly of the present invention including the hitch ball assembly and the mounting assembly.

FIG. 2 is a rear elevational view of the hitch assembly of the present invention in the storage position;

FIG. 2a is a section view illustrating the latch and finger loop of the present invention;

FIG. 3 is a rear elevational action view illustrating the manipulation of the various components of the present invention in order to place the hitch assembly in the towing position;

FIG. 3a is a detailed, rear elevational view showing the locking of the security door;

FIG. 4 is a top plan view of the hitch assembly with the hitch ball in the towing position and the security door open;

FIG. 5 is a top plan view showing the hitch assembly in the closed position.

Figure 24:
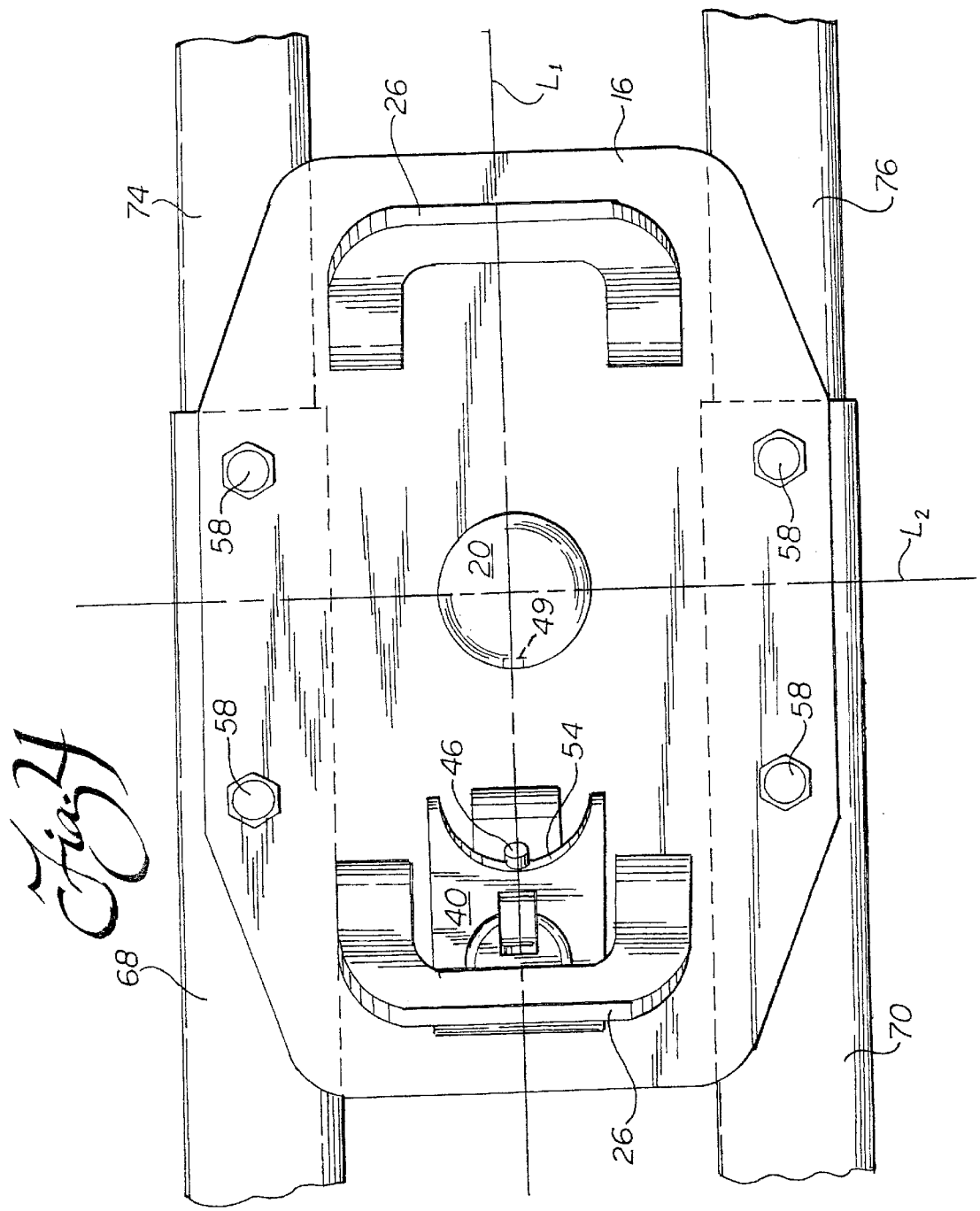

Reference will now be made in detail to the present preferred embodiment of the invention, an example of which is illustrated in the accompanying drawing.

DETAILED DESCRIPTION OF THE INVENTION

Reference is now made to FIG. 1 showing a hitch assembly 10 which may be readily and easily installed in the bed of a vehicle, such as a pick-up truck. Hitch assembly 10 includes a hitch ball assembly, generally designated by reference numeral 12, and a mounting subassembly, generally designated by reference numeral 14.

As shown in the drawing figures, the hitch ball assembly 12 includes a housing comprising a floor plate 16 and a pair of spaced underlying support plates 18. Preferably, these are constructed from heavy gauge steel and the plates 16 and 18 are welded together. A hitch ball 20 is pivotally connect to the support plates 18 of the housing by means of pin 22 (see FIGS. 2, 3 and 6). A lubrication fitting 24 is mounted to the hitch ball 20 over an internal passageway or conduit (not shown) that allows the pivotal connection of the pin 22 with the support plates 18 to be lubricated. As should be appreciated from reviewing FIG. 5, the lubrication fitting 24 is provided on the upwardly projecting face of the hitch ball 20 when the hitch ball is pivoted into the storage position (see also FIG. 2). Advantageously, this conveniently located lubrication fitting 24 encourages greasing and lubrication of the parts so as to maintain the hitch assembly 10 in peak operating conditions. This allows easy manipulation or displacement of the hitch ball 20 between the storage position shown in FIGS. 2 and 5 and the towing position, best shown in FIG. 1 but also shown in FIGS. 3, 3a and 4.

The hitch ball assembly 12 also includes a pair of safety chain anchors 26, each substantially U-shaped. Each of the safety chain anchors includes a pair of integrally formed mounting loops 28 and a pin or stub shaft 30 is provided for connecting each end of a mounting loop to one of the support plates 18 of the housing (see also FIG. 6). Further, each safety chain anchor 26 includes a projecting tab 32 carrying an aperture 34. A torsion spring 36 includes a first end for engaging the aperture 34 and a second end for engaging an aperture 38 in one of the support plates 18 of the housing. Each torsion spring 36 functions to maintain and provide a positive pressure for holding a safety chain anchor 26 in either the safety chain receiving position (upright position) shown in FIGS. 1, 3 and 4 or the inclined storage position shown in FIGS. 2 and 5. As should also be appreciated from reviewing FIG. 5, when in the storage position, one of the safety chain anchors 26 is folded so as to overlie and protect the lubrication fitting 24 from injury from objects that may be dropped into or otherwise positioned in the vehicle to which the hitch assembly 10 is mounted.

As further shown in the drawing figures, the hitch ball assembly 12 also includes a security door 40 that is likewise mounted by means of a pin 42 to the support plates 18 of the housing. As best shown in FIGS. 1, 3 and 5, security door 40 carries a finger loop 44 that may be engaged with the fingers and utilized to displace the security door from the closed position shown in FIGS. 1 and 5 to the opened position shown in FIGS. 3 and 4. When the security door 40 is open, the hitch ball 20 may be pivoted between the towing position in which it projects vertically upwardly and the storage position in which it is inclined and received between the support plates 18 beneath the floor plate 16. When the hitch ball 20 is in the storage position, the security door 40 may be closed flush with the floor plate 16 and the safety chain anchors 26 may be folded downwardly into the storage position so as to directly overlie the floor plate.

In this position shown in FIG. 2, the bed V of the vehicle or pick-up truck to which the hitch assembly 10 is mounted is free to receive materials such as plywood sheet without any substantial interference. A torsion spring 46 having one end secured in an aperture 48 in a lug 50 carried by the security door 40 and another end secured in an aperture 52 in one of the support plates 18 provides a positive pressure that maintains the security door 40 in either the closed position shown in FIG. 2 or the open position shown in FIGS. 3 and 4 with the necessary clearance to allow the displacement of the hitch ball 20 to the towing position.

When it is desired to utilize the hitch assembly 10 for towing, the operator first displaces the safety chain anchors 26 from the storage position shown in FIG. 2 outwardly in the direction of action arrows A shown in FIG. 3 to the safety chain receiving position best shown in FIGS. 1, 3 and 4. Next, the finger loop 44 is engaged and pulled so as to pivot the security door 40 in the direction of action arrow B (see FIG. 3) to the ally opened positioned (see FIG. 4). There, the security door 40 is held in place by the torsion spring 46. While opening, the distal end 43 of the security door 40 engages and partially raises the hitch ball 20. This allows the necessary clearance to allow the hitch ball 20 to be fully pivoted in the direction of action arrow C (see FIG. 3) from the storage position shown in FIG. 2 to the towing position shown in FIG. 3.

In the present preferred embodiment, a securing means 41 both includes the finger loop 44 and a cooperating latch 45. In a normal position best shown in FIGS. 2a and 4, one end 45' of the latch 45 is biased outwardly by spring 47 and extends beyond the edge 54 of the security door 40. Thus, during closing of the security door 40 as shown in FIG. 3a, the outwardly extending end 45' of the latch 45 is depressed inwardly by the hitch ball 20 in the direction of the action arrow D. This allows the security door 40 to be fully closed so that the security door is flush with the floor plate 16 (see FIG. 1). At the fully closed position, the latch end 45' is in alignment with a slot 49 in hitch ball 20 thus allowing the end 45' to be biased outwardly into the slot 49 to positively maintain the security door 40 in the closed position. This positive latching action provides the operator with visual confirmation that the hitch ball 20 is secured in the proper towing position.

To replace the hitch ball 20 to the storage position, finger loop 44 is engaged with one hand and pulled/lifted, thus retracting latch 45 and necessarily latch end 45' from slot 49. Once free of the slot 49, the security door 40 pivots upwardly; that is withdrawal of the latch 45 provides the necessary clearance to allow the security door 40 to fully open and the hitch ball 20 to be fully pivoted from the towing position shown in FIG. 3 to the storage position shown in FIG. 2.

Another important aspect of the present invention is demonstrated with reference FIGS. 1 and 4. Specifically, it should be noted that the safety chain anchors 26 are substantially aligned with the hitch ball 20 along a first line that runs substantially perpendicular to the longitudinal axis of the towing vehicle (note, lines $L_1$ and $L_2$ in FIG. 4). As a result of this geometric configuration, the safety chains (not shown) attached to the safety chain anchors 26 are prevented from engaging and binding upon the hitch ball 20 even when maneuvering through sharp turns such as are often necessitated when negotiating parking lots or trailer camping sites. Thus, the prospect of damaged and broken safety chains as a result of binding all to commonly associated with prior art safety chain connection schemes where the safety chain connection is forward of the hitch ball is substantially eliminated.

Figure 6:
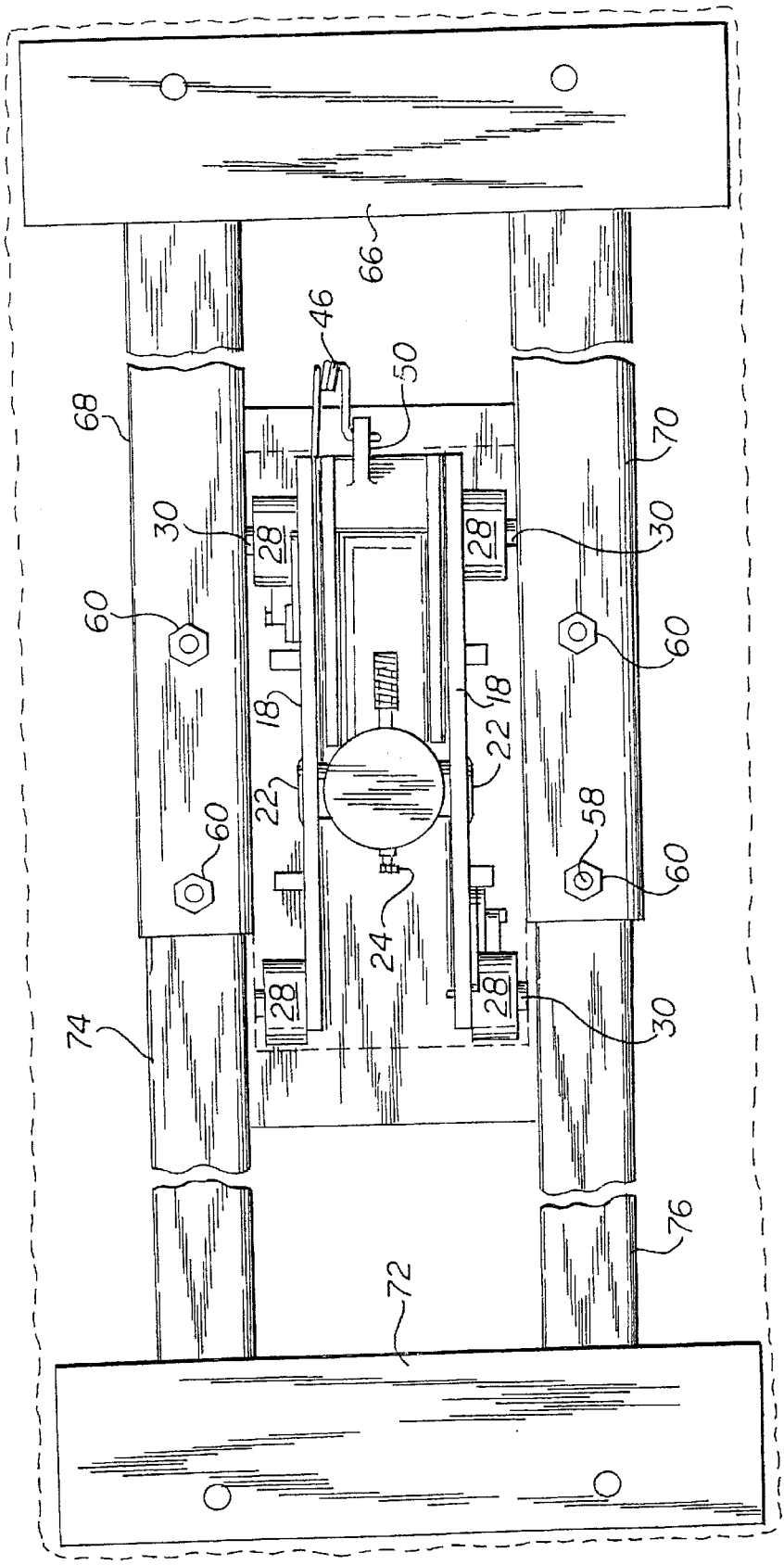
FIG. 6 is a bottom plan view of the hitch assembly.

As should be appreciated from viewing FIGS. 1 and 6, the hitch ball assembly 12 is secured to the mounting subassembly 14 by means of four bolts 58 and cooperating nuts 60. When properly positioned, the hitch ball subassembly 12 overlies the bed V of the vehicle while the mounting subassembly 14 underlies the bed. The mounting subassembly will now be described in detail.

The mounting subassembly 14 comprises two cooperating telescoping sections 62, 64. The first section 62 includes an end plate 66 welded at one end to a tubular strut or brace 68 and at the other end to a tubular strut or brace 70. As should be appreciated the tubular braces 68, 70 are coextensive and parallel. Similarly, the second section 64 includes an end plate 72 connected at one end to a tubular strut or brace 74 and at the other end to a tubular strut or brace 76. The tubular braces 74, 76 are also coextensive and parallel.

As should be further appreciated from viewing FIGS. 1, 4, 5 and 6 the tubular braces 74, 76 are dimensioned for insertion and free sliding movement through the tubular braces 68, 70. Accordingly, a freely telescoping mounting subassembly 14 is provided. Advantageously, since this mounting subassembly 14 includes only two telescoping sections 62, 64, it may be collapsed or contracted to a sufficiently narrow width dimension to allow the mounting subassembly 14 to be easily maneuvered around fuel lines, electrical lines and exhaust system components, as well as other vehicle components that might otherwise represent an obstruction to its installation between the frame rails of the vehicle in a manner described in greater detail below.

Advantageously, the hitch assembly 10 may be easily installed on the vehicle. As a preliminary step on some vehicles it may be necessary to remove the spare tire and/or an exhaust heat shield. The first step in the actual installation process is the locating of a registration point in the bed of the pick-up truck. This is done by measuring forward from the back of the truck bed a predetermined number of inches: the distance varying depending on the make and model pick-up truck. This measurement is centered between the left and right hand sides of the bed.

Next is the marking of a hitch assembly opening on the bed. This is done based upon the location of the registration point. Specifically, a 12⅝×7¼ inch rectangle is located on the pick-up truck bed utilizing the registration mark as the ball center: that is, the point that will be the center of the hitch ball once it is installed and positioned for towing. This is done by positioning a template so that it is the centered between the fender wells with the ball center as marked on the template corresponding with the ball center registration point marked on the truck bed. The template is then taped into position.

The points of the template represent the centers of ten 1⅛ inch diameter holes to be sawed using a 1⅛ inch diameter hole saw. Two additional holes are drilled on each end over the truck frame rails. Each of the fourteen holes is first drilled with a ⅛ inch drill bit. A 1⅛ inch hole saw is then used to cut the ten center holes while a 1⅛ inch drill bit is used to drill the four end holes through the bed and the underlying frame rails. Of course, prior to any drilling or cutting the installer checks to confirm the necessary clearance exists and that there is no interference with fuel lines, brake lines, electrical lines, etc.

Next a saber saw is used to cut the hitch assembly opening H in the bed V. Specifically, the opening is cut along the template lines which run between and connect the ten holes previously cut with the hole saw. This method allows for smooth, round corners as opposed to sharp, square corners.

Next is the positioning of the mounting subassembly 14 under the bed of the pick-up truck onto the frame. More specifically, the two sections 62, 64 are telescopingly contracted or collapsed so as to minimize the width of the mounting subassembly 14. This makes it easier to manipulate the mounting subassembly 14 around lines, exhaust pipes and any other obstacles to placement. Once adjacent the overlying bed and above the frame rails, the sections 62, 64 are telescopingly extended and one end plate is placed so as to rest on the top flange of each frame rail R while straddling the hitch assembly opening H. With the holes 78 in the braces 68, 70 and the holes 78 in the braces 74, 76 now in alignment, the hitch ball subassembly 12 is positioned onto the mounting subassembly 14 so that the support plates 18 of the housing fall between the braces 68, 70 and 74, 76. The floor plate 16 of the housing overlies the braces 68, 70, 74, 76 and includes four apertures 84 that align with the brace holes 78. Carriage bolts 58 are inserted through the aligned apertures 84 and holes 78 in order to hold this relative positioning.

Next, a carriage bolt 86 is inserted through each access hole into each square end plate hole 82. This is then followed by the securing of the mounting subassembly 14 to the frame and the hitch ball subassembly 12 to the mounting subassembly. More specifically, nuts 60, 88 and lock washers (not shown) are secured to the bolts 58, 86 previously inserted in the holes 78 and the end plate holes 82, respectively. Each of these are, of course, tightened to the desired torque in order to provide a secure connection. The access holes drilled in the bed over the frame rails are then capped to provide a finished aesthetically pleasing appearance.

The foregoing description of the preferred embodiment has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A gooseneck hitch assembly for mounting on a vehicle, comprising:

a housing;

a security door pivotally connected to said housing and selectively displaceable between an open position and a closed position;

a latch carried by said security door;

a hitch ball pivotally connected to said housing for selective displacement between an upright towing position and an inclined storage position, said hitch ball including a slot for receiving an end of said latch for securing said security door in said closed position and said hitch ball in said towing position.

2. The gooseneck hitch assembly of claim 1, further including a pair of safety chain anchors pivotally mounted to said housing for selective displacement between a receiving position and a storage position; and a mounting subassembly for mounting to said frame of said vehicle.

3. The gooseneck hitch assembly of claim 2, further including a lubrication fitting for lubricating said pivotal connection carried on said hitch ball, said lubrication fitting being exposed and easily accessible on an upwardly facing portion of said hitch ball when said hitch ball is in said storage position so as to allow convenient lubrication of said pivotal connection.

4. The gooseneck hitch assembly of claim 3, wherein at least one of said safety chain anchors of said pair of anchors overlies and protects said lubrication fitting in said storage position.

5. A gooseneck hitch assembly for mounting on a vehicle, comprising:

a housing;

a security door pivotally connected to said housing and selectively displaceable between an open position and a closed position;

a securing means carried by said security door;

a hitch ball pivotally connected to said housing for selective displacement between an upright towing position and an inclined storage position, said hitch ball including a slot for receiving an end of said securing means for securing said security door in said closed position and said hitch ball in said towing position.

6. The gooseneck hitch assembly of claim 5, further including a pair of safety chain anchors pivotally mounted to said housing for selective displacement between a receiving position and a storage position; and a mounting subassembly for mounting to said frame of said vehicle.

7. The gooseneck hitch assembly of claim 6, further including a lubrication fitting for lubricating said pivotal connection carried on said hitch ball, said lubrication fitting being exposed and easily accessible on an upwardly facing portion of said hitch ball when said hitch ball is in said storage position so as to allow convenient lubrication of said pivotal connection.

8. The gooseneck hitch assembly of claim 7, wherein at least one of said safety chain anchors of said pair of anchors overlies and protects said lubrication fitting in said storage position.

* * * * *